US012692103B2

(12) United States Patent
Seok et al.

(10) Patent No.: US 12,692,103 B2
(45) Date of Patent: Jul. 28, 2026

(54) VEHICLE AND VEHICLE LOGISTICS CONTROL METHOD

(71) Applicants: Hyundai Motor Company, Seoul (KR); Kia Corporation, Seoul (KR)

(72) Inventors: Donghee Seok, Seoul (KR); Jongbok Lee, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 366 days.

(21) Appl. No.: 18/335,402

(22) Filed: Jun. 15, 2023

(65) Prior Publication Data

US 2024/0132306 A1    Apr. 25, 2024
US 2024/0228197 A9    Jul. 11, 2024

(30) Foreign Application Priority Data

Oct. 25, 2022    (KR) ........................ 10-2022-0137972

(51) Int. Cl.
    *B65G 67/08*       (2006.01)
(52) U.S. Cl.
    CPC .................................... *B65G 67/08* (2013.01)
(58) Field of Classification Search
    CPC .................................... B60P 3/007; B60P 1/52
    See application file for complete search history.

(56) References Cited

U.S. PATENT DOCUMENTS

| | | | | | |
|---|---|---|---|---|---|
| 10,525,865 | B2 * | 1/2020 | Wilkinson | ................ | B60P 3/20 |
| 10,988,069 | B2 * | 4/2021 | Vincent | ................ | B65G 13/02 |
| 12,008,507 | B2 * | 6/2024 | Hong | ................ | B60P 1/52 |
| 12,344,287 | B2 * | 7/2025 | Hwang | ................ | B65G 67/20 |
| 2017/0107056 | A1 * | 4/2017 | Kadaba | ................ | G07C 5/008 |
| 2020/0354171 | A1 | 11/2020 | Vincent | | |
| 2022/0105853 | A1 | 4/2022 | Lee et al. | | |
| 2023/0384804 | A1 * | 11/2023 | Chen | ................ | G06Q 10/083 |

FOREIGN PATENT DOCUMENTS

| | | |
|---|---|---|
| CN | 112406672 A | 2/2021 |
| JP | H07291433 A | 11/1995 |
| JP | 2019112226 A | 7/2019 |
| KR | 20160081009 A | 7/2016 |
| KR | 101815583 B1 | 1/2018 |
| KR | 102208006 B1 | 1/2021 |
| KR | 20220045637 A | 4/2022 |

OTHER PUBLICATIONS

Brightdrop, retrieved from https://www.gobrightdrop.com/products/brightdrop-trace-move, 9 pages.

* cited by examiner

*Primary Examiner* — Mark C Hageman

(74) *Attorney, Agent, or Firm* — Slater Matsil, LLP

(57) ABSTRACT

An embodiment vehicle includes a freight loading box, conveyer balls installed in the freight loading box, a goods loader configured to move and load goods grouped according to a delivery destination to positions set in the freight loading box by controlling the conveyor balls, and a goods unloader configured to move the goods for the delivery destination toward an entrance side of the freight loading box by controlling the conveyor balls upon arrival of the vehicle at the delivery destination.

20 Claims, 6 Drawing Sheets

Door Side

Delivery destination (B) arrival

105

102

Door Side

Delivery destination (A) arrival

FIG. 6

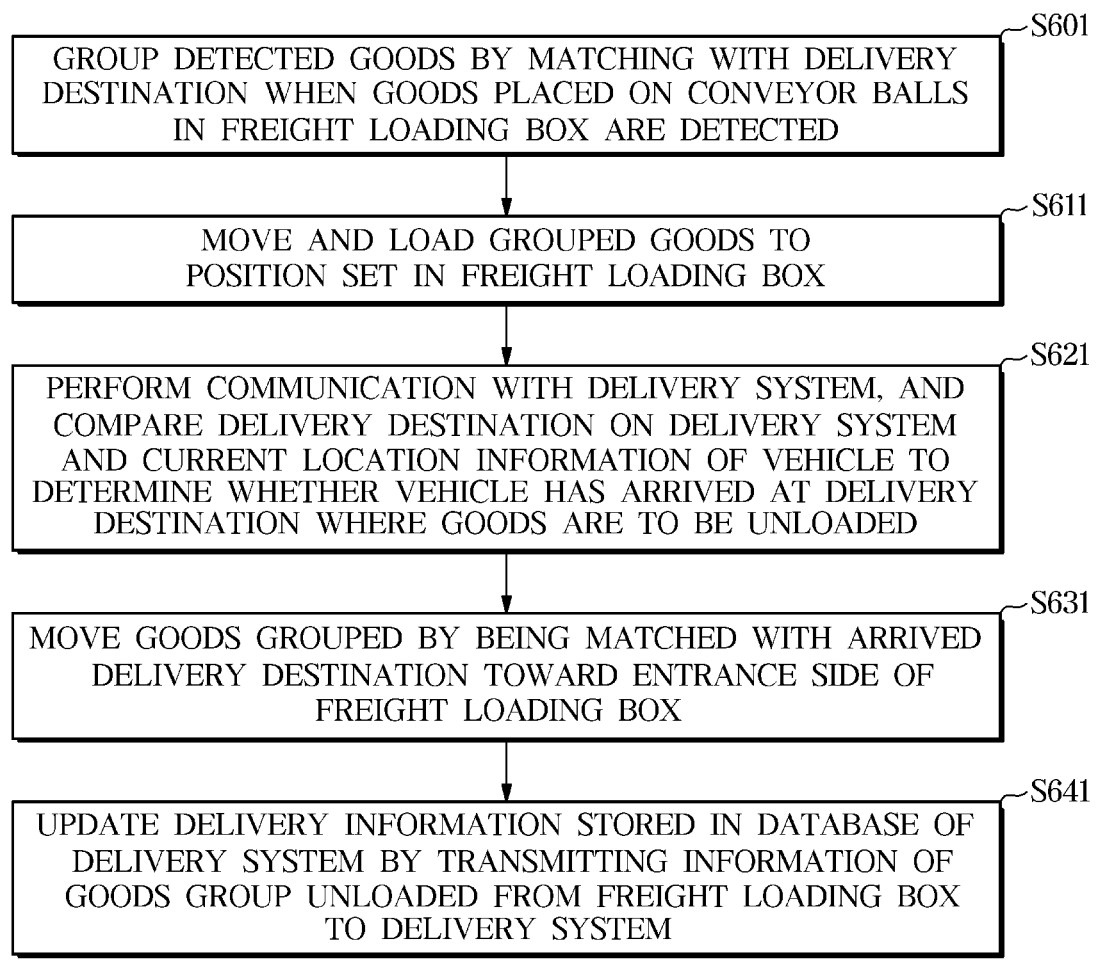

S601
GROUP DETECTED GOODS BY MATCHING WITH DELIVERY
DESTINATION WHEN GOODS PLACED ON CONVEYOR BALLS
IN FREIGHT LOADING BOX ARE DETECTED

S611
MOVE AND LOAD GROUPED GOODS TO
POSITION SET IN FREIGHT LOADING BOX

S621
PERFORM COMMUNICATION WITH DELIVERY SYSTEM, AND
COMPARE DELIVERY DESTINATION ON DELIVERY SYSTEM
AND CURRENT LOCATION INFORMATION OF VEHICLE TO
DETERMINE WHETHER VEHICLE HAS ARRIVED AT DELIVERY
DESTINATION WHERE GOODS ARE TO BE UNLOADED

S631
MOVE GOODS GROUPED BY BEING MATCHED WITH ARRIVED
DELIVERY DESTINATION TOWARD ENTRANCE SIDE OF
FREIGHT LOADING BOX

S641
UPDATE DELIVERY INFORMATION STORED IN DATABASE OF
DELIVERY SYSTEM BY TRANSMITTING INFORMATION OF
GOODS GROUP UNLOADED FROM FREIGHT LOADING BOX
TO DELIVERY SYSTEM

VEHICLE AND VEHICLE LOGISTICS CONTROL METHOD

CROSS-REFERENCE TO RELATED APPLICATIONS

This application claims the benefit of Korean Patent Application No. 10-2022-0137972, filed on Oct. 25, 2022, which application is hereby incorporated herein by reference.

TECHNICAL FIELD

The disclosure relates to a vehicle and a vehicle logistics control method.

BACKGROUND

When goods are delivered to multiple delivery destinations, goods in a freight loading box of a vehicle may be arranged in reverse order according to the order of visits to the delivery destinations.

However, a lot of labor is required for a delivery driver to classify goods for each delivery destination and to load the goods from an innermost side of the freight loading box to an entrance side of the freight loading box, and the deeper the inside of the freight loading box, the more effort that is required.

Also, when arriving at each delivery destination and unloading goods, at the beginning of delivery, the goods are loaded close to the entrance side of the freight loading box, and thus the delivery driver may unload the goods relatively easily, but in the later stages of delivery, the goods are loaded deep inside the freight loading box, and thus a considerable amount of time is required to unload the goods, and the physical strength of the delivery driver is consumed. As a result, the efficiency of delivery may decrease.

SUMMARY

An embodiment of the disclosure provides a vehicle and a vehicle logistics control method capable of increasing delivery efficiency.

Additional embodiments of the disclosure will be set forth in part in the description which follows and, in part, will be obvious from the description, or may be learned by practice of the disclosure.

In accordance with an embodiment of the disclosure, a vehicle includes a goods loader provided to move and load goods, which are grouped by being matched for each delivery destination, to positions set in a freight loading box in which conveyor balls are installed by controlling the conveyor balls, and a goods unloader provided to move goods, which are grouped by being matched with an arrived delivery destination, toward an entrance side of the freight loading box by controlling the conveyor balls when the vehicle arrives at the delivery destination.

The vehicle may further include a ball controller configured to control driving of the conveyor balls and a sensor unit provided to detect goods placed on the conveyor balls.

The goods loader may include a grouping unit provided to group detected goods by matching with the delivery destination when the goods placed on the conveyor balls are detected by the sensor unit.

The goods loader may further include a goods information transmitter provided to transmit information of the goods grouped by being matched with the delivery destination to a display screen of the vehicle or a screen of a user terminal connected to the vehicle and a loading position setter provided to set a dropped position in the freight loading box as a position to load the grouped goods when the grouped goods are dragged and dropped in the freight loading box graphically displayed on the display screen or the screen of the user terminal.

The goods loader may, when a size of a loading space at the set position in the freight loading box is smaller than the total volume of the goods grouped by being matched with the delivery destination, divide the grouped goods to suit the size of the loading space, load the divided goods into the loading space, and load the remaining goods among the grouped goods into a space adjacent to the loading space.

The goods unloader may further include a delivery destination checker configured to perform communication with a delivery system and compare delivery destination information on the delivery system with current location information of the vehicle to determine whether the vehicle has arrived at the delivery destination where the goods are to be unloaded and may move the goods grouped by being matched with the delivery destination toward the entrance side of the freight loading box by control of the ball controller when the vehicle arrives at the delivery destination.

The goods unloader may further include a vehicle state detector provided to detect a gear position and door open state of the vehicle, may determine that the vehicle has arrived at the delivery destination on the delivery system when a gear of the vehicle is in a parking position or the door is in an open state, and may move the goods grouped by being matched with the delivery destination toward the entrance side of the freight loading box by the control of the ball controller.

The goods unloader may further include a delivery information updater provided to transmit information of goods unloaded from the freight loading box to the delivery system to update delivery information stored in a database of the delivery system.

In response to a command received from the user terminal, the goods loader may move the grouped goods to the set position in the freight loading box, and the goods unloader may move the grouped goods toward the entrance side of the freight loading box.

In accordance with another embodiment of the disclosure, a vehicle logistics control method includes a loading process of moving and loading goods, which are grouped by being matched for each delivery destination, to positions set in a freight loading box in which conveyor balls are installed by controlling the conveyor balls, and a moving process of moving goods, which are grouped by being matched with an arrived delivery destination, toward an entrance side of the freight loading box by controlling the conveyor balls when a vehicle arrives at the delivery destination.

The loading process may include a process of grouping detected goods by matching with the delivery destination when goods placed on the conveyor balls are detected and a process of moving the grouped goods to a loading space in the freight loading box.

The loading process may include a process of transmitting information of the goods grouped by being matched with the delivery destination to a display screen of the vehicle or a screen of a user terminal connected to the vehicle, a process of setting a dropped position in the freight loading box as a position to load the grouped goods when the grouped goods are dragged and dropped in the freight loading box graphically displayed on the display screen or the screen of the user terminal, and a process of moving the goods grouped by being matched with the delivery destination to the set position in the freight loading box.

The vehicle logistics control method may further include a process of, when a size of a loading space at the set position in the freight loading box is smaller than the total volume of the goods grouped by being matched with the delivery destination, dividing the grouped goods to suit the size of the loading space, loading the divided goods into the loading space, and loading the remaining goods among the grouped goods into a space adjacent to the loading space.

The moving process may include a process of performing communication with a delivery system and comparing delivery destination information on the delivery system with current location information of the vehicle to determine whether the vehicle has arrived at the delivery destination where the goods are to be unloaded and a process of moving the goods grouped by being matched with the delivery destination toward the entrance side of the freight loading box by control of a ball controller when the vehicle arrives at the delivery destination.

The process of determining whether the vehicle has arrived at the delivery destination where the goods are to be unloaded may include a process of selectively detecting a gear position and door open state of the vehicle and determining that the vehicle has arrived at the delivery destination on the delivery system when a gear of the vehicle is in a parking position or a door is in an open state.

The vehicle logistics control method may further include a process of transmitting information of goods unloaded from the freight loading box to the delivery system to update delivery information stored in a database of the delivery system.

BRIEF DESCRIPTION OF THE DRAWINGS

These and/or other embodiments of the disclosure will become apparent and more readily appreciated from the following description of the exemplary embodiments, taken in conjunction with the accompanying drawings, in which:

FIG. 5 illustrates that a goods group matched with a delivery destination A illustrated in FIG. 4 is unloaded, and a goods group matched with a delivery destination B is moved toward an entrance side after the vehicle arrives at the delivery destination B, which is the next destination; and FIG. 6 is a flowchart illustrating a vehicle logistics control method using the components of the vehicle in FIG. 1.

DETAILED DESCRIPTION OF ILLUSTRATIVE EMBODIMENTS

Figure 1:
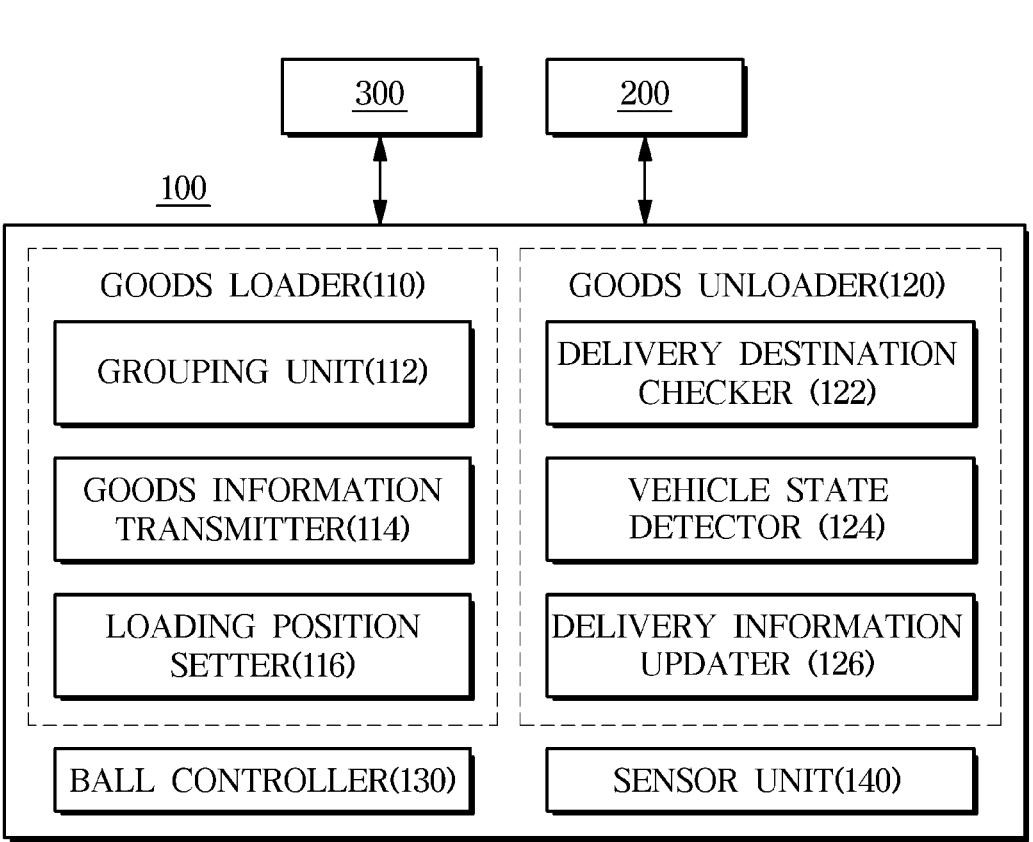
FIG. 1 is a block diagram illustrating components of a vehicle according to an embodiment of the disclosure.

Throughout the specification, like reference numerals refer to like components. This specification does not describe all factors of embodiments, and duplicative contents between general contents or embodiments in the technical field of the disclosure will be omitted.

Throughout the specification, when a part is referred to as being "connected" to another part, it includes not only a direct connection but also an indirect connection, and the indirect connection includes connecting through a wireless network.

When it is described that a part "includes" a component, it means that the part may further include other components, not excluding the other components unless specifically stated otherwise.

The singular forms "a," "an," and "the" include plural referents unless the context clearly dictates otherwise.

In addition, terms such as "~unit," "~part," "~block," "~member," "~module," and the like may denote a unit for processing at least one function or operation. For example, the terms may refer to at least one hardware such as a field-programmable gate array (FPGA)/an application specific integrated circuit (ASIC), at least one software stored in a memory, or at least one process processed by a processor.

In each step, an identification numeral is used for convenience of explanation, the identification numeral does not describe the order of the steps, and each step may be performed differently from the order specified unless the context clearly states a particular order.

Hereinafter, embodiments of the disclosure will be described in detail with reference to the accompanying drawings.

Figure 2:
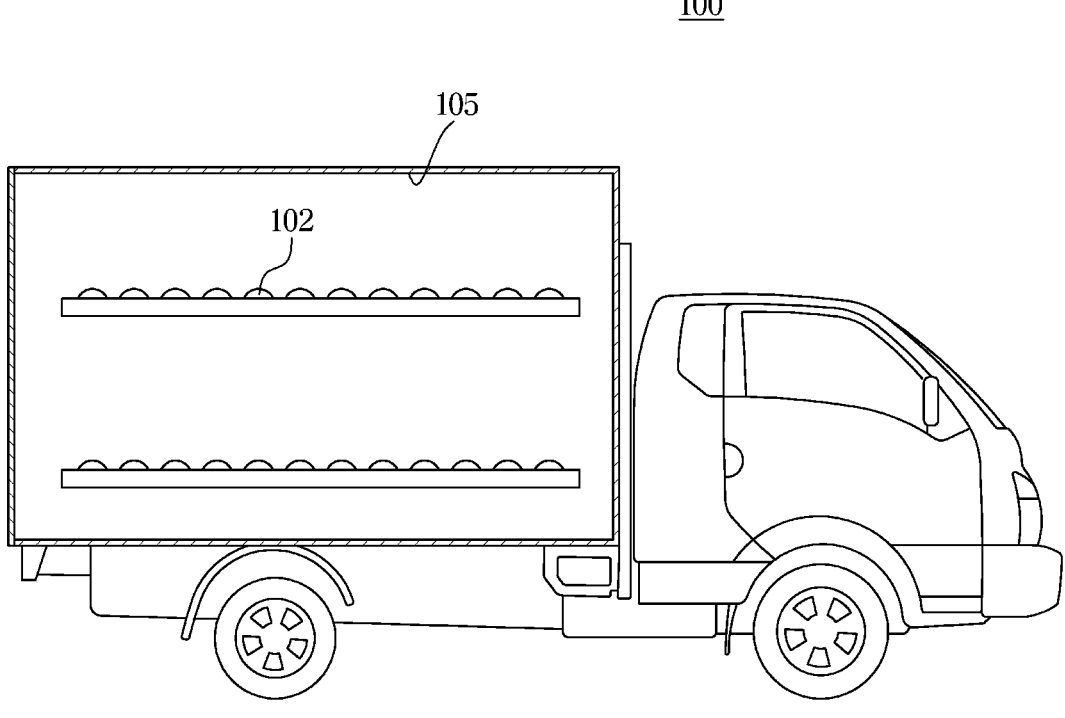
FIG. 2 illustrates that conveyor balls are installed in a vehicle freight loading box of the vehicle in FIG. 1.

FIG. 1 is a block diagram illustrating components of a vehicle according to an embodiment of the disclosure, and FIG. 2 illustrates that conveyor balls are installed in a vehicle freight loading box of the vehicle in FIG. 1.

Referring to FIGS. 1 and 2, a vehicle 100 according to an embodiment of the disclosure includes a goods loader no provided to move and load goods, which are grouped by being matched for each delivery destination (hereinafter referred to as goods groups), to positions set in a freight loading box 105 in which conveyor balls 102 are installed by controlling the conveyor balls 102, and a goods unloader 120 provided to move the goods, which are grouped by being matched with an arrived delivery destination, toward an entrance side of the freight loading box 105 by controlling the conveyor balls 102 when the vehicle 100 arrives at the delivery destination.

The vehicle 100 may also include a ball controller 130 configured to control driving of the conveyor balls 102 and a sensor unit 140 provided to detect goods placed on the conveyor balls 102.

The goods loader no may include a grouping unit 112 provided to match and group detected goods with the delivery destination when goods placed on the conveyor balls 102 are detected by the sensor unit 140.

The goods loader no may also include a goods information transmitter 114 provided to transmit information of the goods grouped by being matched with the delivery destination to a display screen of the vehicle or a screen of a user terminal 300 connected to the vehicle and a loading position setter 116 provided to, when the grouped goods are dragged and dropped in the freight loading box 105 graphically displayed on the display screen or the screen of the user terminal 300, set the dropped position in the freight loading box 105 as a position to load the grouped goods.

Herein, the display screen may output a variety of information related to functions, states, and/or operations of the vehicle 100. The display screen may output a graphic user interface (GUI) including objects (e.g., icons, text, images) for executing or setting various functions of the vehicle boo.

The graphic user interface (GUI) may interact with a user input. The display screen may output a screen corresponding to an input for an object.

The user terminal 300 may be a mobile device equipped with an input/output interface such as a microphone, speaker, and display. The user terminal 300 may operate by being linked with each component of the vehicle 100.

When a size of a loading space at the set position in the freight loading box 105 is smaller than the total volume of goods grouped by being matched with the delivery destination, the goods loader no may divide the grouped goods to suit the size of the loading space, load the divided goods into the loading space, and load the remaining goods among the grouped goods into a space adjacent to the loading space.

The goods unloader 120 may include a delivery destination checker 122 configured to perform communication with a delivery system 200 and compare delivery destination information on the delivery system 200 with current location information of the vehicle to determine whether the vehicle has arrived at the delivery destination where goods are to be unloaded.

The goods unloader 120 may also include a vehicle state detector 124 provided to detect a gear position and door open state of the vehicle.

The goods unloader 120 may also include a delivery information updater 126 provided to transmit information of goods unloaded from the freight loading box 105 to the delivery system 200 to update delivery information stored in a database of the delivery system 200.

Although not shown, the vehicle 100 according to an embodiment of the present disclosure may include a main controller (not shown) to control each component of the vehicle 100 and means related thereto. The main controller may include various processors and a memory. The memory may store programs, instructions, applications, and the like for performing control. Each of the processors may execute the programs, instructions, applications, and the like stored in the memory. The main controller may include control units such as, for example, an electronic control unit (ECU) and a micro controller unit (MCU).

The memory may include a non-volatile memory device such as, for example, a cache, a read only memory (ROM), a programmable ROM (PROM), an erasable programmable ROM (EPROM), an electrically erasable programmable ROM (EEPROM), and a flash memory. Also, the memory may include a volatile memory device such as a random access memory (RAM) and nay include a storage medium such as a hard disk drive (HDD) and a CD-ROM. The memory may store, for example, a variety of information related to a delivery destination, goods, grouped goods information, a loading position, a vehicle state, unloading, and the like. Hereinafter, each component of the vehicle will be described in detail.

The goods loader no moves and loads the goods, which are grouped by being matched for each delivery destination, to the set positions in the freight loading box 105 of the vehicle 100 in which the conveyor balls 102 are installed by controlling the conveyor balls 102.

The vehicle mo, which is a delivery vehicle for delivering goods, may perform a delivery work by receiving information about a delivery destination, goods, and the like from the delivery system 200 by being linked with the delivery system 200 including a transportation management system (TMS) and a fleet management system (FMS).

A plurality of the conveyor balls 102 arranged in a row is installed in the freight loading box 105 of the vehicle 100. The freight loading box 105 may be provided with a plurality of layers in which the conveyor balls 102 are installed. The conveyor balls 102 may be able to rotate in all directions.

The conveyor balls 102 installed for each layer may be rotated in their positions by individual motors, and driving and driving directions of the conveyor balls 102 may be individually controlled by the ball controller 130.

When goods are placed on the conveyor balls 102, the goods may be detected by the sensor unit 140 and displayed on the display screen of the vehicle wo or on the screen of the user terminal 300 linked with the vehicle 100.

Figure 3:
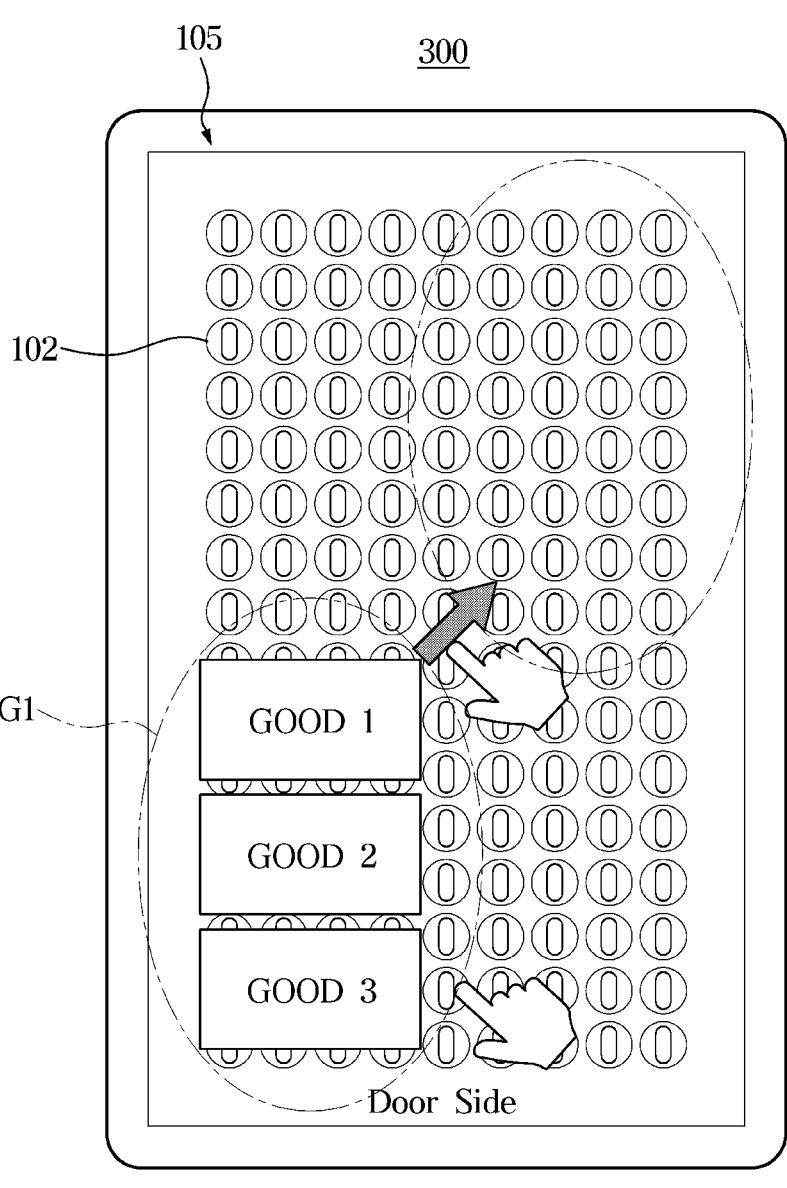
FIG. 3 illustrates that goods displayed on a screen of a user terminal according to an embodiment of the disclosure are dragged and dropped to a position in the freight loading box graphically displayed.

FIG. 3 illustrates that goods displayed on a screen of a user terminal according to an embodiment of the disclosure are dragged and dropped to a position in the freight loading box graphically displayed.

When goods placed on the conveyor balls 102 are detected by the sensor unit 140, the grouping unit 112 matches the detected goods with the delivery destination and groups the detected goods.

For example, referring to FIG. 3, when goods 1 to 3 are placed on the conveyor balls 102 arranged in the freight loading box 105 of the vehicle 100, information on the goods 1 to 3 is transmitted to the user terminal 300 by the goods information transmitter 114. On the screen of the user terminal 300, the goods 1 to 3 may be displayed in a block form in the freight loading box 105 displayed graphically. In addition, the colors of the conveyor balls 102 on which the goods 1 to 3 are placed may be displayed differently to indicate that the goods 1 to 3 are detected.

Because the goods 1 to 3 are in a state of being placed at the entrance side of the freight loading box 105 of the vehicle 100, also on the screen of the user terminal 300, the goods 1 to 3 are displayed on the entrance side of the freight loading box 105 graphically displayed.

In this case, the goods 1 to 3 placed on the conveyor balls 102 may be automatically grouped into the same group (e.g., group G1) by the grouping unit 112 by being matched with a pre-designated delivery destination through the display screen of the vehicle 100 or the screen of the user terminal 300.

As another example, when a user selects the goods 1 to 3 on the screen of the user terminal 300 and designates the delivery destination, the grouping unit 112 may group the corresponding goods 1 to 3 into the same group based on the selected goods 1 to 3 and information on the delivery destination.

The user may drag and drop the goods 1 to 3 displayed on the screen of the user terminal 300 from the freight loading box 105 graphically displayed. The goods in the vehicle freight loading box may generally be arranged in reverse order according to the order of visits at the delivery destinations.

When the user drags and drops the grouped goods from the freight loading box 105 graphically displayed on the screen of the user terminal 300, the loading position setter 116 sets the dropped position in the freight loading box 105 as a space in which the grouped goods are to be loaded. The goods loader no actually moves the goods 1 to 3 grouped into the same group to the position set in the freight loading box 105 by controlling the conveyor balls 102.

At this time, when the volume of goods grouped into the group G1 is large and all of the goods may not be loaded into the loading space set on the screen of the user terminal 300, the goods may be divided and loaded.

To this end, when the size of the loading space at the set position in the freight loading box 105 is smaller than the total volume of goods grouped by being matched with the delivery destination, the goods loader no may subdivide the goods grouped into group G1 into groups G1-1 and G1-2 to suit the size of the loading space to automatically load goods grouped into the group G1-1 into a loading space set by the user and load goods of the group G1-2 into a space adjacent to the loading space set by the user.

A position of the loading space of the goods 1 to 3 set on the screen of the user terminal 300 by the user may be changed using a drag-and-drop method. In addition, the size of the loading space in the freight loading box 105 may be automatically adjusted to suit the volume of the grouped goods 1 to 3.

With the above method, the goods groups may be loaded from an inner corner of the freight loading box 105 for each delivery destination.

The user terminal 300 may operate in I/F interlocking with each component of the vehicle 100.

In response to a command received from the user terminal 300, the goods loader no may move the grouped goods to the set position in the freight loading box 105, and the goods unloader 120 may move the grouped goods toward the entrance side of the freight loading box 105.

For example, the user may touch the screen of the user terminal 300 to move the grouped goods to a loading position in the freight loading box 105 or move the goods toward the entrance side of the freight loading box 105 by controlling the conveyor balls 102 when the vehicle arrives at the delivery destination.

In this case, the conveyor balls 102 disposed in a corresponding direction may be driven by the ball controller 130 depending on a touch direction on the screen of the user terminal 300.

An optimal path for moving goods to be unloaded at a delivery destination toward the entrance side of the freight loading box 105 may be displayed on the screen of the user terminal 300.

When the vehicle state detector 124 detects that a gear of the vehicle is in a parking position or the door is in an open state, a notification message indicating that the vehicle has reached the delivery destination may be transmitted to the screen of the user terminal 300.

The goods loader no may transmit information on the grouped goods and a goods loading position in the freight loading box 105 to the user terminal 300.

The goods unloader 120 may also transmit information of goods unloaded from the freight loading box 105 to the user terminal 300.

Figure 4:
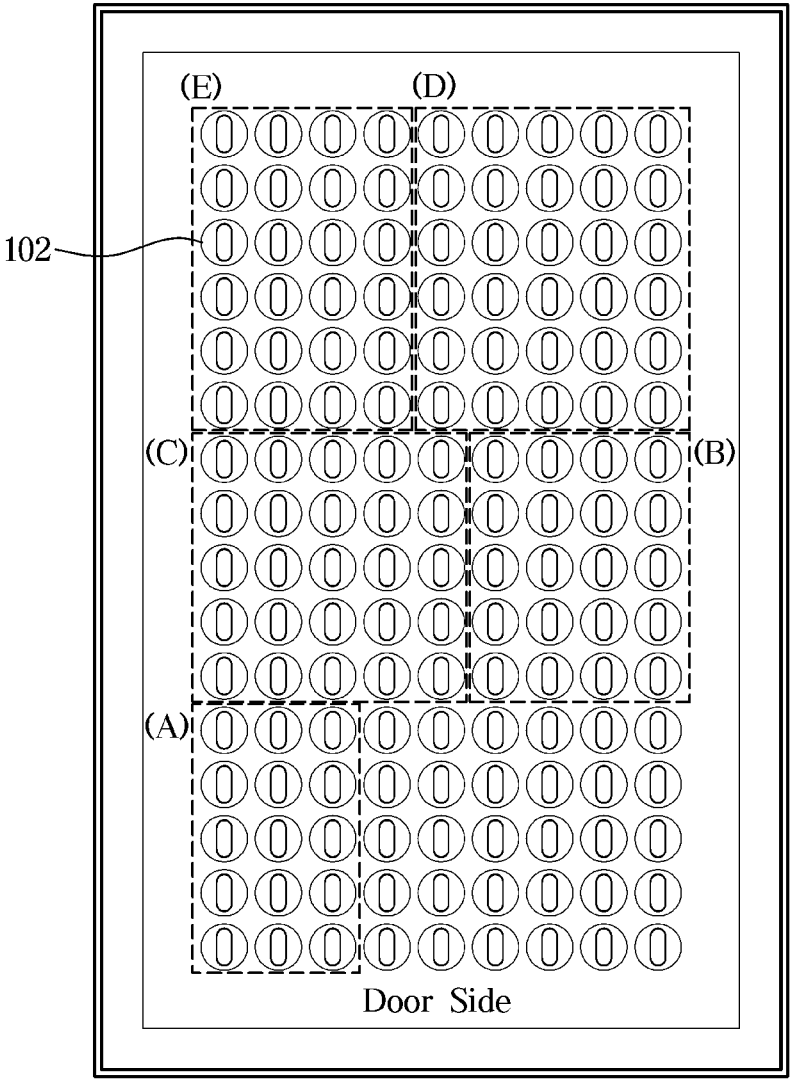
FIG. 4 illustrates that goods groups are arranged for each delivery destination in the freight loading box of the vehicle in FIG. 1.
Figure 5:
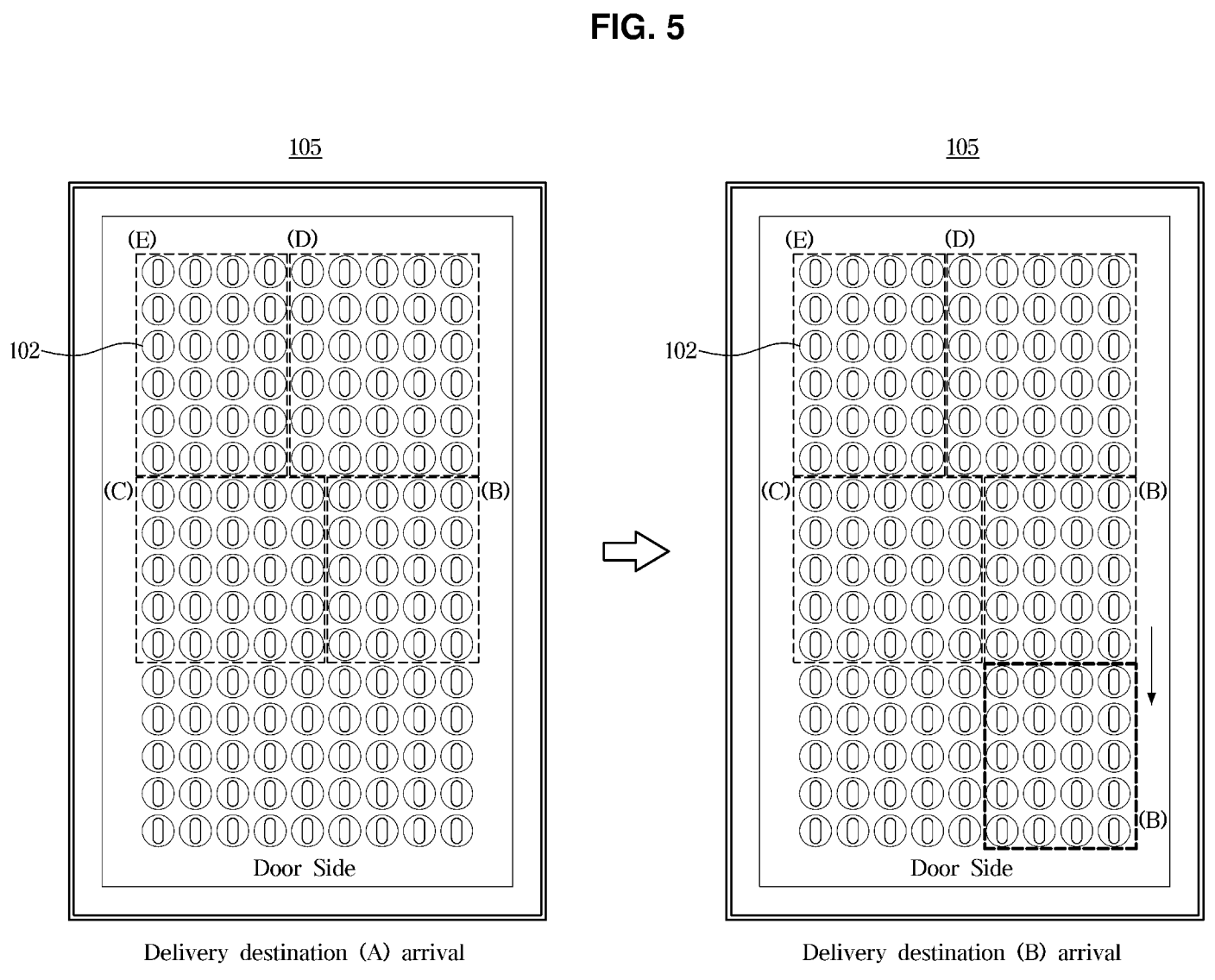

FIG. 4 illustrates that goods groups are arranged for each delivery destination in the freight loading box of the vehicle in FIG. 1, and FIG. 5 illustrates that a goods group matched with a delivery destination A illustrated in FIG. 4 is unloaded, and a goods group matched with a delivery destination B is moved toward an entrance side after the vehicle arrives at the delivery destination B, which is the next destination. For better understanding, in FIGS. 4 and 5, goods groups matched for each of delivery destinations A to E are displayed in a rectangular shape, and the shape of the goods is not shown.

As illustrated in FIG. 4, goods grouped by being matched with each of the delivery destinations A to E may be loaded into the freight loading box 105 of the vehicle 100. In this case, the goods groups may be loaded in the order of visits from the innermost side of the freight loading box 105 toward the entrance side of the freight loading box 105. The order of visits may be sequentially performed from the earliest delivery destination A to the latest delivery destination E.

Accordingly, the goods group matched with the delivery destination E, which has the latest visit order, is placed in the innermost corner of the freight loading box 105, and the goods group matched with the delivery destination A, which has the earliest visit order, is placed on the door side of the freight loading box 105.

The position set in the freight loading box 105 for each of the delivery destinations A to E may be set by the user through the user terminal 300 in the drag-and-drop method as described above or may be set in advance according to the order of visits.

As illustrated in FIG. 5, when the vehicle arrives at the delivery destination A, the goods group matched with the delivery destination A loaded at the entrance side of the freight loading box 105 is unloaded.

When the vehicle arrives at the delivery destination B, which is the next destination, the goods grouped by being matched with the delivery destination B are moved toward the entrance side of the freight loading box 105 by controlling the conveyor balls 102.

As such, when the vehicle arrives at the delivery destination, the goods group matched with the delivery destination is moved towards the entrance side of the freight loading box 105 by controlling the conveyor balls 102.

Referring to FIG. 1, when the vehicle arrives at the delivery destination, the goods unloader 120 moves the goods grouped by being matched with the arrived delivery destination toward the entrance side of the freight loading box 105 by controlling the conveyor balls 102.

At this time, the delivery destination checker 122 may perform communication with the delivery system 200 and compare the delivery destination information on the delivery system 200 with the current location information of the vehicle 100 to determine whether the vehicle has arrived at the delivery destination where the goods are to be unloaded.

When it is determined that the vehicle has arrived at the delivery destination by the delivery destination checker 122, the goods unloader 120 may move the goods grouped by being matched with the arrived delivery destination toward the entrance side of the freight loading box 105 by controlling the conveyor balls 102.

For example, as described above, when the vehicle arrives at the delivery destination B, the goods unloader 120 may move the goods grouped by being matched with the delivery destination B toward the entrance side of the freight loading box 105 by controlling the conveyor balls 102. Through this, the user may easily unload goods in a standby state by being moved to the entrance side of the freight loading box 105 in advance.

The vehicle state detector 124 detects the gear position and door open state of the vehicle. When the vehicle state detector 124 detects that the gear of the vehicle is in the parking position or the door is in the open state, the goods unloader 120 may determine that the vehicle has arrived at the delivery destination on the delivery system 200 and move the goods group matched with the arrived delivery destination toward the entrance side of the freight loading box 105 by controlling the conveyor balls 102.

As such, the goods unloader 120 may determine that the vehicle has arrived at the delivery destination on the delivery system 200 by at least one of the delivery destination checker 122 and the vehicle state detector 124 and may move the goods grouped by being matched with the arrived delivery destination toward the entrance side of the freight loading box 105 by controlling the conveyor balls 102.

A process of updating the delivery information stored in the database of the delivery system 200 may be performed after the goods matched with the delivery destination are unloaded from the freight loading box 105.

To this end, the delivery information updater 126 may transmit information on the goods unloaded from the freight loading box 105 to the delivery system 200 so that the delivery information stored in the database of the delivery system 200 is updated.

FIG. 6 is a flowchart illustrating a vehicle logistics control method using the components of the vehicle in FIG. 1.

Referring to FIG. 6, first, when goods placed on the conveyor balls 102 in the freight loading box 105 are detected, the detected goods are grouped by being matched with the delivery destination (S601).

In this case, a process may be performed in which, when information of goods that are matched with the delivery destination and grouped into the same group is transmitted to the display screen of the vehicle or the screen of the user terminal 300 connected to the vehicle and the corresponding goods group is dragged and dropped from the freight loading box 105 graphically displayed on the display screen or the screen of the user terminal 300, the dropped position in the freight loading box 105 is set as a loading position of the corresponding goods group.

Next, the grouped goods as described above are moved and loaded to the set position in the freight loading box 105 by controlling the conveyor balls 102 (S611).

Herein, when the size of the loading space at the set position in the freight loading box 105 is smaller than the total volume of goods grouped by being matched with the delivery destination, the grouped goods to suit the size of the loading space may be divided and loaded into the loading space, and the remaining goods may be loaded in close contact with each other in a space adjacent to the loading space.

Through the above-described processes (S601 and S611), the goods grouped by being matched for each delivery destination may be loaded (placed) at the set position in the freight loading box 105.

Next, communication with the delivery system 200 is performed, and the delivery destination information on the delivery system 200 and the current location information of the vehicle are compared to determine whether the vehicle has arrived at the delivery destination where the goods are to be unloaded (S621).

In this case, in the process of determining whether the vehicle has arrived at the delivery destination where the goods are to be unloaded, the gear position and door open state of the vehicle may be selectively detected, and when the gear of the vehicle is in the parking position or the door is in the open state, it may be determined that the vehicle has arrived at the delivery destination on the delivery system 200.

Next, the goods grouped by being matched with the arrived delivery destination are moved toward the entrance side of the freight loading box 105 by controlling the conveyor balls 102 (S631). The user may conveniently unload the group of goods waiting by being moved to the entrance side of the freight loading box 105 in advance.

Thereafter, a process of updating the delivery information stored in the database of the delivery system 200 by transmitting the information of the goods group unloaded from the freight loading box 105 to the delivery system 200 is performed (S641). For example, the delivery system 200 may receive information of the unloaded goods at the delivery destination and exclude the unloaded goods from delivery targets.

As is apparent from the above, according to a vehicle and a vehicle logistics control method of embodiments of the disclosure, delivery efficiency can be increased.

In addition, goods grouped for each delivery destination can be moved to set positions in a freight loading box in which conveyor balls are installed by controlling the conveyor balls to increase the convenience of loading goods.

In addition, when the vehicle arrives at a delivery destination, the goods grouped by being matched with the arrived delivery destination are moved toward an entrance side of the freight loading box by controlling the conveyor balls, so that a process of unloading the goods can be performed effectively and conveniently.

The embodiments of the disclosure are not limited to the embodiments mentioned above, and other embodiments not mentioned will be clearly understood by those skilled in the art from the description of the claims.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A vehicle comprising:
   a display screen;
   a freight loading box;
   conveyor balls installed in the freight loading box;
   a goods loader configured to move and load goods grouped according to a delivery destination to positions set in the freight loading box by controlling the conveyor balls, wherein the goods loader is configured to set a dropped position in the freight loading box as a loading space for the grouped goods, based on a position where a graphical representation of the grouped goods is dragged and dropped into a graphical representation of the freight loading box that is displayed on the display screen of the vehicle; and
   a goods unloader configured to move the grouped goods for the delivery destination toward an entrance side of the freight loading box by controlling the conveyor balls upon arrival of the vehicle at the delivery destination.

2. The vehicle according to claim 1, further comprising:
   a ball controller configured to control driving of the conveyor balls; and
   a sensor unit configured to detect the goods placed on the conveyor balls.

3. The vehicle according to claim 2, wherein the goods loader comprises a grouping unit configured to group the goods detected by the sensor unit by matching the goods with the delivery destination in response to the goods placed on the conveyor balls being detected by the sensor unit.

4. The vehicle according to claim 3, wherein the goods loader further comprises:
   a goods information transmitter configured to transmit information of the grouped goods to the display screen of the vehicle or a display screen of a user terminal connected to the vehicle; and
   a loading position setter configured to set a dropped position in the freight loading box as a loading space for the grouped goods, based on a position where another graphical representation of the grouped goods is dragged and dropped into another graphical representation of the freight loading box that is graphically displayed on the display screen of the user terminal.

5. The vehicle according to claim 4, wherein, in response to a size of the loading space being smaller than a total volume of the grouped goods to be loaded into the loading space, the goods loader is configured to:

divide the grouped goods into sub-groups, wherein a first sub-group of the grouped goods has a size suiting the size of the loading space;

load the first sub-group of the grouped goods into the loading space; and load a second sub-group of the grouped goods into a space adjacent to the loading space.

6. The vehicle according to claim 4, wherein:

the goods loader is configured to move the grouped goods to the positions set in the freight loading box in response to a command received from the user terminal; and the goods unloader is configured to move the grouped goods toward the entrance side of the freight loading box in response to a second command received from the user terminal after the arrival of the vehicle at the delivery destination.

7. A vehicle comprising:

a display screen;

a freight loading box;

conveyor balls installed in the freight loading box;

a goods loader configured to move and load goods grouped according to a delivery destination to positions set in the freight loading box by controlling the conveyor balls, wherein the goods loader is configured to set a dropped position in the freight loading box as a loading space for the grouped goods, based on a position where a graphical representation of the grouped goods is dragged and dropped into a graphical representation of the freight loading box that is displayed on the display screen of the vehicle; and a goods unloader comprising a delivery destination checker configured to perform communication with a delivery system and compare delivery destination information of the delivery system with current location information of the vehicle to determine whether the vehicle has arrived at the delivery destination where the grouped goods are to be unloaded, wherein the goods unloader is configured to move the grouped goods for the delivery destination toward an entrance side of the freight loading box by controlling the conveyor balls upon arrival of the vehicle at the delivery destination.

8. The vehicle according to claim 7, further comprising:

a ball controller configured to control driving of the conveyor balls; and a sensor unit configured to detect the goods placed on the conveyor balls.

9. The vehicle according to claim 8, wherein the goods loader comprises a grouping unit configured to group the goods detected by the sensor unit by matching the goods with the delivery destination in response to the goods placed on the conveyor balls being detected by the sensor unit.

10. The vehicle according to claim 9, wherein the goods loader further comprises:

a goods information transmitter configured to transmit information of the grouped goods to the display screen of the vehicle or a display screen of a user terminal connected to the vehicle; and a loading position setter configured to set a dropped position in the freight loading box as a loading space for the grouped goods, based on a position where another graphical representation of the grouped goods is dragged and dropped into another graphical representation of the freight loading box that is graphically displayed on the display screen of the user terminal.

11. The vehicle according to claim 10, wherein, in response to a size of the loading space being smaller than a total volume of the grouped goods to be loaded in the loading space, the goods loader is configured to:

divide the grouped goods into sub-groups, wherein a first sub-group of the grouped goods has a size suiting the size of the loading space;

load the first sub-group of the grouped goods into the loading space; and load a second sub-group of the grouped goods into a space adjacent to the loading space.

12. The vehicle according to claim 8, wherein the goods unloader further comprises a vehicle state detector configured to detect a gear position and a state of a door of the vehicle, wherein the goods unloader is configured to:

determine that the vehicle has arrived at the delivery destination based on the gear position of the vehicle being in a parking position or the state of the door being an open state; and move the grouped goods toward the entrance side of the freight loading box by a control of the ball controller.

13. The vehicle according to claim 7, wherein the goods unloader further comprises a delivery information updater configured to transmit information about the grouped goods unloaded from the freight loading box to the delivery system to update delivery information stored in a database of the delivery system.

14. A vehicle logistics control method, the method comprising:

loading goods grouped according to a delivery destination to positions set in a freight loading box of a vehicle in which conveyor balls are installed by controlling the conveyor balls, wherein loading the grouped goods comprises:

setting a dropped position in the freight loading box as a loading space for the grouped goods, based on a position where a graphical representation of the grouped goods is dragged and dropped into a graphical representation of the freight loading box that is displayed on a display screen of the vehicle; and moving the grouped goods toward an entrance side of the freight loading box by controlling the conveyor balls in response to the vehicle arriving at the delivery destination.

15. The method according to claim 14, wherein loading the goods grouped according to the delivery destination comprises:

grouping the goods by matching the goods to the delivery destination in response to the goods placed on the conveyor balls being detected; and loading the grouped goods in a loading space in the freight loading box.

16. The method according to claim 15, wherein the method further comprises:

transmitting information about the grouped goods matched with the delivery destination to the display screen of the vehicle or a display screen of a user terminal connected to the vehicle;

setting a dropped position in the freight loading box as a loading space for the grouped goods, based on a position where another graphical representation of grouped goods is dragged and dropped into another graphical representation of the freight loading box that is graphically displayed on the display screen of the user terminal; and moving the grouped goods to the loading space in the freight loading box.

17. The method according to claim 16, wherein, in response to a size of the loading space being smaller than a total volume of the grouped goods to be loaded into the loading space, the method further comprises:

dividing the grouped goods into sub-groups, wherein a first sub-group of the grouped goods has a size suiting the size of the loading space;

loading the first sub-group of the grouped goods into the loading space; and loading a second sub-group of the grouped goods into a space adjacent to the loading space.

18. The method according to claim 14, wherein moving the grouped goods comprises:

performing communication with a delivery system and comparing delivery destination information of the delivery system with current location information of the vehicle to determine whether the vehicle has arrived at the delivery destination where the grouped goods are to be unloaded; and moving the grouped goods toward the entrance side of the freight loading box by control of a ball controller in response to a determination that the vehicle has arrived at the delivery destination.

19. The method according to claim 18, wherein determining whether the vehicle has arrived at the delivery destination where the grouped goods are to be unloaded comprises:

selectively detecting a gear position and a state of a door of the vehicle; and determining that the vehicle has arrived at the delivery destination based on the gear position being a parking position or the state of the door being an open state.

20. The method according to claim 18, further comprising transmitting information about the grouped goods unloaded from the freight loading box to the delivery system to update delivery information stored in a database of the delivery system.

* * * * *